United States Patent
Reddy et al.

(10) Patent No.: US 12,430,587 B2
(45) Date of Patent: Sep. 30, 2025

(54) OBJECT LEVEL SPACE FORECASTING

(71) Applicant: Dell Products L.P., Round Rock, TX (US)

(72) Inventors: Shanand Reddy, Kulim (MY); Chew Chien Wern, Penang (MY); Choo Lead Ta, Puchong (MY)

(73) Assignee: Dell Products L.P., Round Rock, TX (US)

( * ) Notice: Subject to any disclaimer, the term of this patent is extended or adjusted under 35 U.S.C. 154(b) by 957 days.

(21) Appl. No.: 17/074,179

(22) Filed: Oct. 19, 2020

(65) Prior Publication Data

US 2022/0121997 A1    Apr. 21, 2022

(51) Int. Cl.
  *G06N 20/10*     (2019.01)
  *G06F 16/21*     (2019.01)
(52) U.S. Cl.
  CPC ............ *G06N 20/10* (2019.01); *G06F 16/21* (2019.01)
(58) Field of Classification Search
  CPC ....... G06N 20/10; G06F 16/21; G06F 16/219; G06F 16/2219; G06F 16/289
  See application file for complete search history.

(56) References Cited

U.S. PATENT DOCUMENTS

| | | | |
|---|---|---|---|
| 10,445,738 B1 * | 10/2019 | Waters | G06N 20/20 |
| 2017/0249564 A1 * | 8/2017 | Garvey | G06T 11/001 |
| 2020/0242090 A1 * | 7/2020 | Prasad | G06F 16/901 |
| 2021/0064428 A1 * | 3/2021 | Eriksson | G06Q 10/0639 |
| 2021/0342652 A1 * | 11/2021 | Glassman | G06F 18/251 |

OTHER PUBLICATIONS

Scikit-learn 0.23.2, User Guide, Machine, Sections 1.4 Support Vector Machines and 1.7 Gaussian Processes, available at https://scikit-learn.org/stable/user_guide.html (accessed Oct. 19, 2020).

* cited by examiner

*Primary Examiner* — Ryan C Vaughn
(74) *Attorney, Agent, or Firm* — Ryan, Mason & Lewis, LLP (57) ABSTRACT

Methods, apparatus and processor-readable storage media for object level space forecasting are provided herein. An example computer-implemented method includes determining a predicted growth of an object in a database using a non-linear regression model, wherein the non-linear regression model is trained using a set of data records indicative of a size of the object over time; identifying a threshold indicative of abnormal growth of the object using a classification model, wherein the classification model is trained at least in part on one or more of the data records that are labeled as anomalous based at least in part on one or more prior values of the predicted growth and actual growth of the object; and performing one or more automated operations in response to detecting that the predicted growth of the object exceeds the threshold.

20 Claims, 9 Drawing Sheets

```
import Gaussian process regression library
upload training data
assign alpha value = 0.05
confidence interval = 95%
assign predict field = current_size
fit data points to gpr_model
train model
predict model
calculate accuracy
while accuracy of data points versus prediction is within confidence threshold band < 90%
    increase optimizer value
end while
add growth column in training data
foreach data point in training data
    if data point outside confidence band
        growth value = abnormal growth
    else
        growth value = normal growth
end foreach
```

```
import support vector machine library
kernel = linear
upload training data with growth column (e.g., from FIG. 3)
assign random 80% training data to train the model
assign remaining 20% data for prediction
fit the data points to svm_model
train model
predict model
calculate accuracy
while model accuracy < 90%
    add more training_data records
end while
```

OBJECT LEVEL SPACE FORECASTING

FIELD

The field relates generally to information processing systems, and more particularly to storage in such systems.

BACKGROUND

Storage spaces are increasingly becoming larger and more complex as more organizations focus on big data. The increased size and complexity make it difficult to identify and address problems related to, for example, wasted resources, performance issues and/or outages in such storage spaces.

SUMMARY

Illustrative embodiments of the disclosure provide object level space forecasting techniques. An exemplary computer-implemented method includes determining a predicted growth of an object in a database using a non-linear regression model, wherein the non-linear regression model is trained using a set of data records indicative of a size of the object over time; identifying a threshold indicative of abnormal growth of the object using a classification model, wherein the classification model is trained at least in part on one or more of the data records that are labeled as anomalous based at least in part on one or more prior values of the predicted growth and actual growth of the object; and performing one or more automated operations in response to detecting that the predicted growth of the object exceeds the threshold.

Illustrative embodiments can provide significant advantages relative to conventional capacity management techniques. For example, challenges associated with complex databases in storage systems are overcome in one or more embodiments through object level space forecasting to maintain and/or enhance query performance in storage systems.

These and other illustrative embodiments described herein include, without limitation, methods, apparatus, systems and computer program products comprising processor-readable storage media.

DETAILED DESCRIPTION

Illustrative embodiments will be described herein with reference to exemplary computer networks and associated computers, servers, network devices or other types of processing devices. It is to be appreciated, however, that these and other embodiments are not restricted to use with the particular illustrative network and device configurations shown. Accordingly, the term "computer network" as used herein is intended to be broadly construed, so as to encompass, for example, any system comprising multiple networked processing devices.

Figure 1:
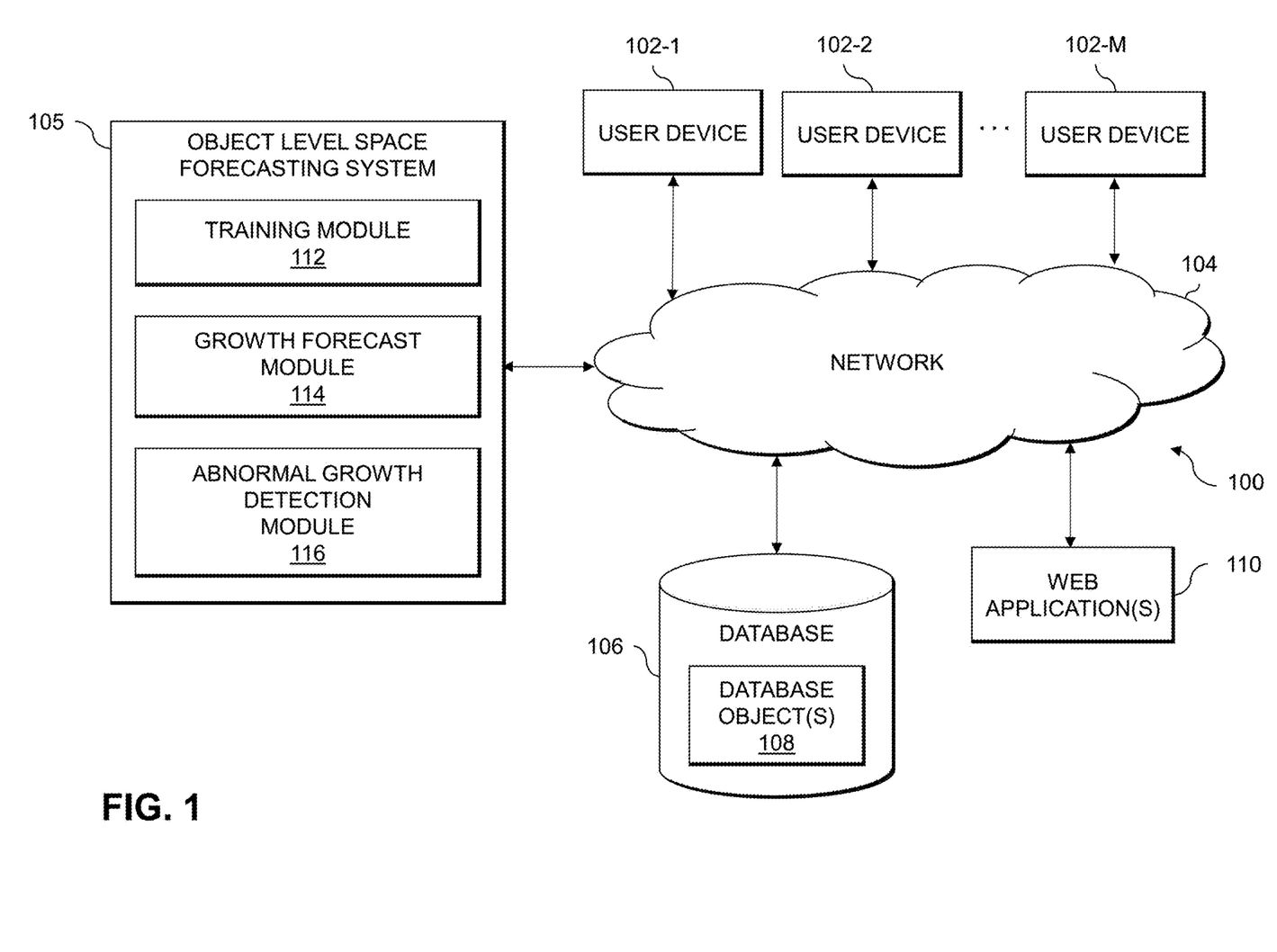
FIG. 1 shows an information processing system configured for object level space forecasting in an illustrative embodiment.

FIG. 1 shows a computer network (also referred to herein as an information processing system) 100 configured in accordance with an illustrative embodiment. The computer network 100 comprises a plurality of user devices 102-1, 102-2, . . . 102-M, collectively referred to herein as user devices 102. The user devices 102 are coupled to a network 104, where the network 104 in this embodiment is assumed to represent a sub-network or other related portion of the larger computer network 100. Accordingly, elements 100 and 104 are both referred to herein as examples of "networks", but the latter is assumed to be a component of the former in the context of the FIG. 1 embodiment. Also coupled to network 104 is object level space forecasting system 105 and one or more web applications 110 (e.g., applications pertaining to storage capacity provisioning, storage planning, etc.).

The user devices 102 may comprise, for example, mobile telephones, laptop computers, tablet computers, desktop computers or other types of computing devices. Such devices are examples of what are more generally referred to herein as "processing devices." Some of these processing devices are also generally referred to herein as "computers."

The user devices 102 in some embodiments comprise respective computers associated with a particular company, organization, or other enterprise. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

Also, it is to be appreciated that the term "user" in this context and elsewhere herein is intended to be broadly construed so as to encompass, for example, human, hardware, software or firmware entities, as well as various combinations of such entities.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a WI-FI or WIMAX network, or various portions or combinations of these and other types of networks. The computer network 100 in some embodiments therefore comprises combinations of multiple different types of networks, each comprising processing devices configured to communicate using internet protocol (IP) or other related communication protocols.

Additionally, the object level space forecasting system 105 can have an associated database 106 configured to store data, which comprise, for example, one or more database objects 108.

The database 106 in the present embodiment is implemented using one or more storage systems associated with the object level space forecasting system 105. Such storage systems can comprise any of a variety of different types of storage including network-attached storage (NAS), storage area networks (SANs), direct-attached storage (DAS) and distributed DAS, as well as combinations of these and other storage types, including software-defined storage.

Also associated with the object level space forecasting system 105 can be input-output devices, which illustratively comprise keyboards, displays or other types of input-output devices in any combination. Such input-output devices can be used, for example, to support one or more user interfaces to the object level space forecasting system 105, as well as to support communication between the object level space forecasting system 105 and other related systems and devices not explicitly shown.

Additionally, the object level space forecasting system 105 in the FIG. 1 embodiment is assumed to be implemented using at least one processing device. Each such processing device generally comprises at least one processor and an associated memory and implements one or more functional modules for controlling certain features of the object level space forecasting system 105.

More particularly, the object level space forecasting system 105 in this embodiment can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises random access memory (RAM), read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including solid-state drives (SSDs), and should therefore not be viewed as limited in any way to spinning magnetic media.

The network interface allows the object level space forecasting system 105 to communicate over the network 104 with the user devices 102, and illustratively comprises one or more conventional transceivers.

The object level space forecasting system 105 further comprises a training module 112, a growth forecast module 114 and an abnormal growth detection module 116.

It is to be appreciated that this particular arrangement of modules 112, 114 and 116 illustrated in the object level space forecasting system 105 of the FIG. 1 embodiment is presented by way of example only, and alternative arrangements can be used in other embodiments. For example, the functionality associated with modules 112, 114 and 116 in other embodiments can be combined into a single module or separated across a larger number of modules. As another example, multiple distinct processors can be used to implement different ones of modules 112, 114 and 116 or portions thereof.

At least portions of modules 112, 114 and 116 may be implemented at least in part in the form of software that is stored in memory and executed by a processor.

It is to be understood that the particular set of elements shown in FIG. 1 for object level space forecasting techniques involving user devices 102 of computer network 100 is presented by way of illustrative example only, and in other embodiments additional or alternative elements may be used. Thus, another embodiment includes additional or alternative systems, devices and other network entities, as well as different arrangements of modules and other components.

An exemplary process utilizing modules 112, 114 and 116 of an example object level space forecasting system 105 in computer network 100 will be described in more detail with reference to the flow diagram of FIG. 7.

Accordingly, at least one embodiment includes using machine learning techniques for object level space forecasting. In some example embodiments, a first machine learning model (e.g., a non-linear regression model) is used to forecast object growth and a second machine learning model (e.g., a classification model) is used to classify abnormal growth. The term "abnormal growth" as used herein refers to growth which is inconsistent with a trend or pattern of growth for a particular database object. For instance, abnormal growth of a database object may occur when its size increases beyond a threshold level of growth within some specified period of time.

In some example embodiments, automated actions may be performed to maintain or improve the efficiency of a database in response to detecting abnormal growth of an object. Such automated actions may include performing an index creation process and a query tuning process. In general, an index creation process creates an efficient index to improve the speed of searches. For example, an index may categorize records in a data table in a particular way so that a certain record may be found without having to scan the table in its entirety.

A query tuning process generally refers to a process that manipulates a query to improve query performance. As an example, Structured Query Language (SQL) is a type of language used to create queries to retrieve records from a database. Such queries use clauses and syntaxes which determine the search results. Poorly structured queries can significantly impact the performance of the query, particularly when the table is large. As such, a query tuning process improves performance by selecting an optimal syntax or by rearranging clauses of a query.

Figure 2:
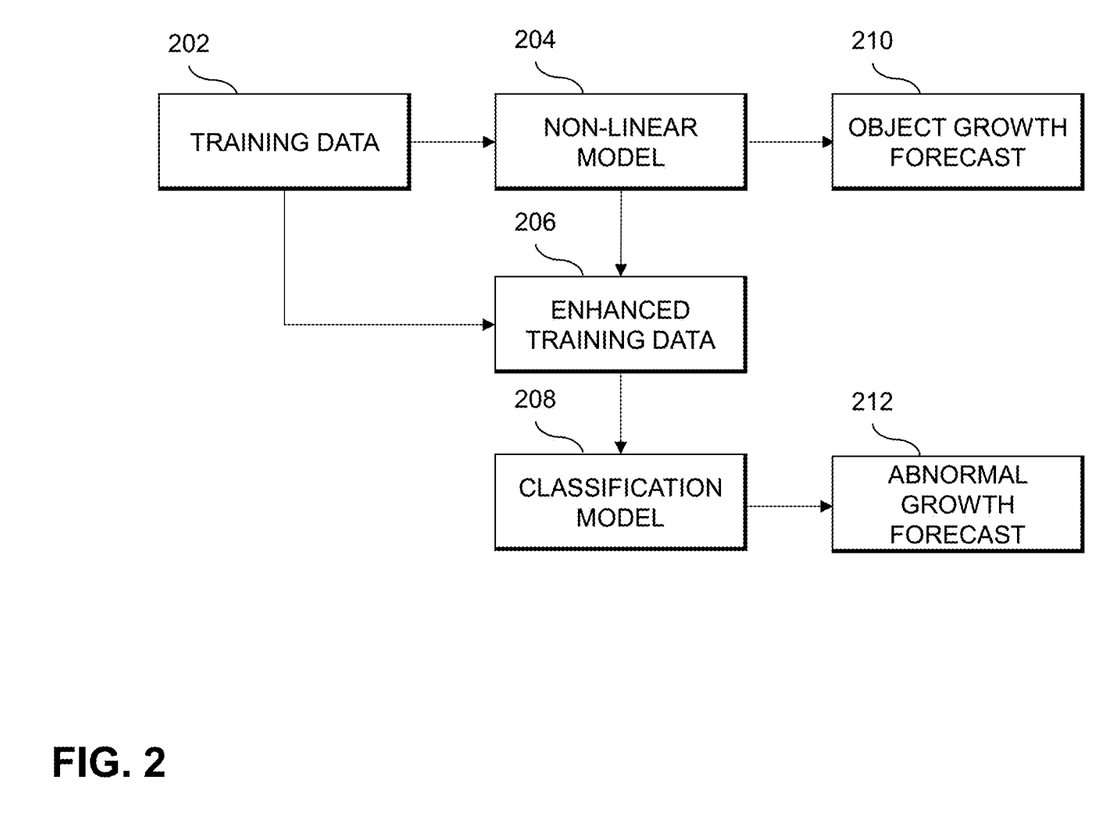
FIG. 2 shows a flow diagram for training machine learning models in an illustrative embodiment.

Referring now to FIG. 2, this figure shows a flow diagram of a process for training a non-linear regression model and a classification model in accordance with one or more example embodiments. The process depicted in FIG. 2 may be implemented at least in part by, for example, the training module 112. In the example shown in FIG. 2, training data 202 are used to train the non-linear regression model 204 to predict the growth of a particular database object. The training data 202 may include historical data for the database object, which are indicative of one or more of inserts, deletes, month, week, weekday, a space difference between two times (e.g., the difference over a day), current size and actual date, for example. In some examples, the training data 202 are in a tabular format, such as a comma-separated values (csv) file, for example. The training continues until the non-linear regression model 204 is configured to generate an object growth forecast 210 that predicts the growth of the object within a certain degree of accuracy as described in further detail below with reference to FIGS. 3-4, for example.

Additionally, the output of the non-linear regression model 204 is used to generate enhanced training data 206, which are then used to train the classification model 208. By way of example, the enhanced training data 206 may include an additional column indicating whether a particular data point in the training data 202 is an outlier. In at least one example embodiment, an outlier corresponds to a data point that is outside a threshold confidence band corresponding to the object growth forecast 210 and represents abnormal growth of the object. The enhanced training data 206 may be a modified version of training data 202, wherein the data points are labeled to indicate normal growth and abnormal growth.

It is to be appreciated that problems in storage spaces generally occur when an object increases in size. Thus, in some embodiments, only the data points that are above the top threshold of the confidence band are labeled as outliers or abnormal growth. All other data points, including those that fall below the bottom threshold of the confidence band, are considered normal growth.

The classification model 208 is then trained using the enhanced training data 206 to generate an abnormal growth forecast 212 of the particular database object. The classification model 208 is trained until the model achieves a threshold level of accuracy (for example, 90%), as described in more detail below with reference to FIG. 6, for example.

Figure 3:
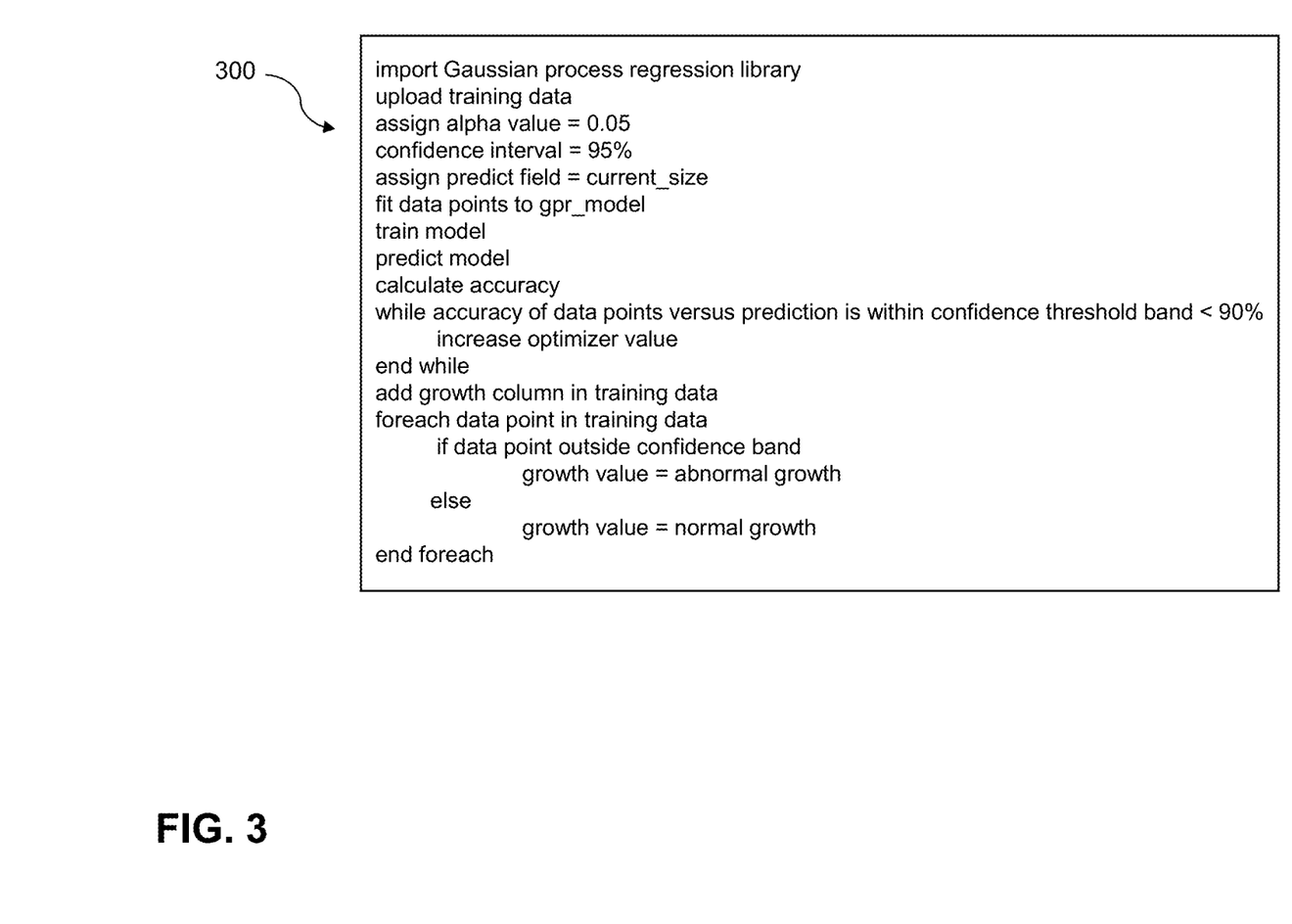
FIG. 3 shows example pseudocode for training a Gaussian Process Regression (GPR) model in an illustrative embodiment.

FIG. 3 shows example pseudocode 300 for training a non-linear regression model in an illustrative embodiment. The example pseudocode 300 is representative of computer code that may be executed by or under the control of at least one processing system and/or device. For example, the example pseudocode 300 may be viewed as comprising a portion of a software implementation of at least part of the object level space forecasting system 105 of the FIG. 1 embodiment.

In this example, the pseudocode 300 corresponds to a GPR model. Pseudocode 300 illustrates steps to import required library files and upload training data. The training data in FIG. 3 may include historical data points for a database object over a specified period of time (for example, one year). It is noted that an alpha value is set to 0.05, which, in some examples, can be applied as a Tikhonov regularization. Pseudocode 300 further illustrates steps to populate a scatter plot with the data points and fit the data points to the GPR model. An optimizer value of the GPR model is increased while the accuracy of the data points relative to the prediction of the GPR model is within a threshold level of accuracy. As a non-limiting example, the threshold level of accuracy in pseudocode 300 is 90%. Pseudocode 300 also includes a step to add a growth column to the training data that labels abnormal growth and normal growth for each data point based on whether or not the datapoint falls within the confidence band. In this example, the confidence band is set using a confidence interval of 95%, but this is merely an example and other values may be used.

It is to be appreciated that the particular example pseudocode 300 shows just one example implementation of a portion of a non-linear regression algorithm, and alternative implementations of the process can be used in other embodiments.

Figure 4:
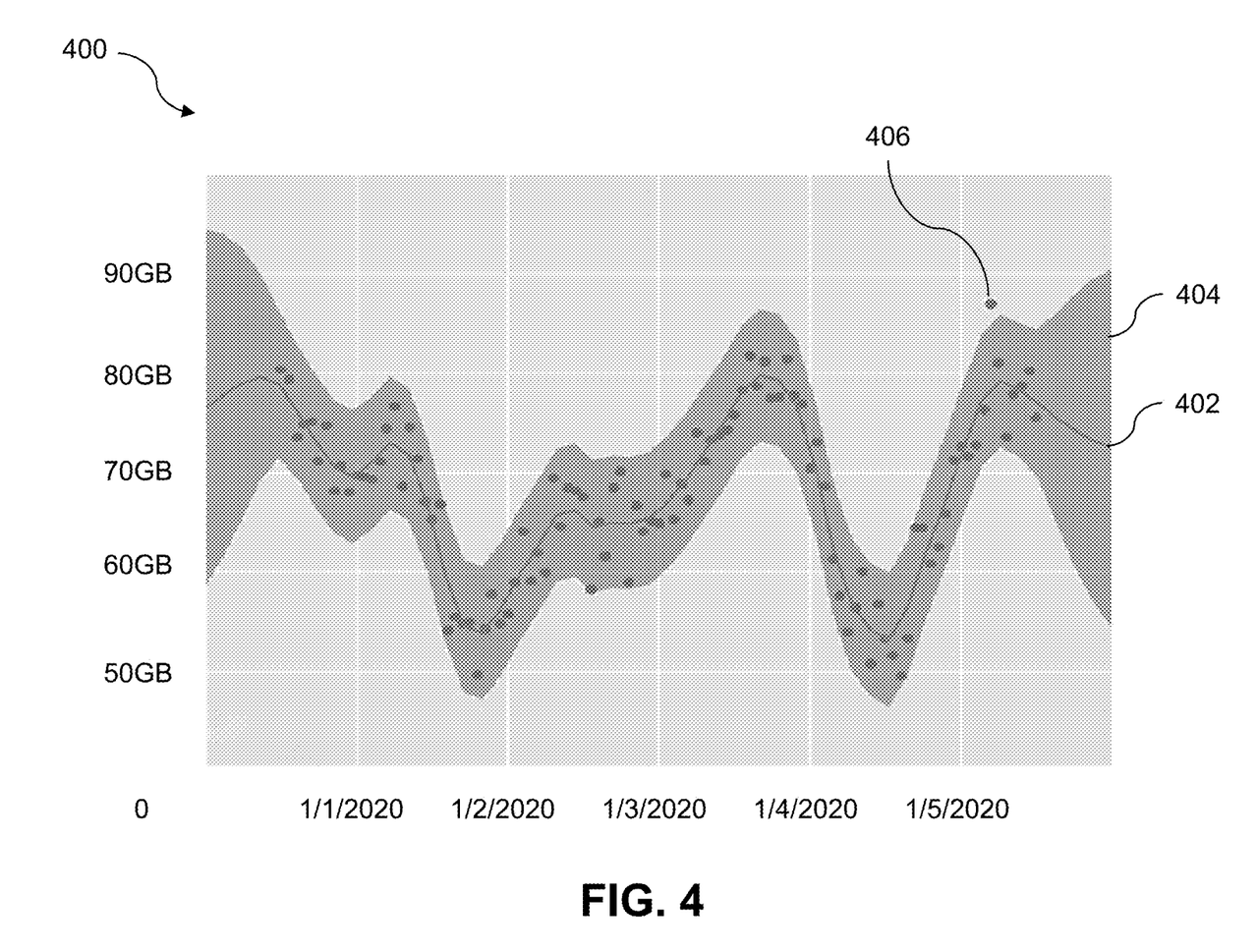
FIG. 4 shows an example of a scatter plot associated with the GPR model in accordance with an illustrative embodiment.

Referring also to FIG. 4, this figure shows an example of a scatter plot 400 associated with the pseudocode 300 in accordance with an illustrative embodiment. Scatter plot 400 includes various datapoints (represented as dots) and a line 402 representing the prediction of the trained GPR model. The shaded area 404 represents the confidence band for the prediction. In this example, there is one data point 406 that falls above the upper portion of the confidence band 404. As such, the data point 406 may be labeled as corresponding to abnormal growth of the database object, whereas the remaining datapoints represent normal growth.

Figure 5:
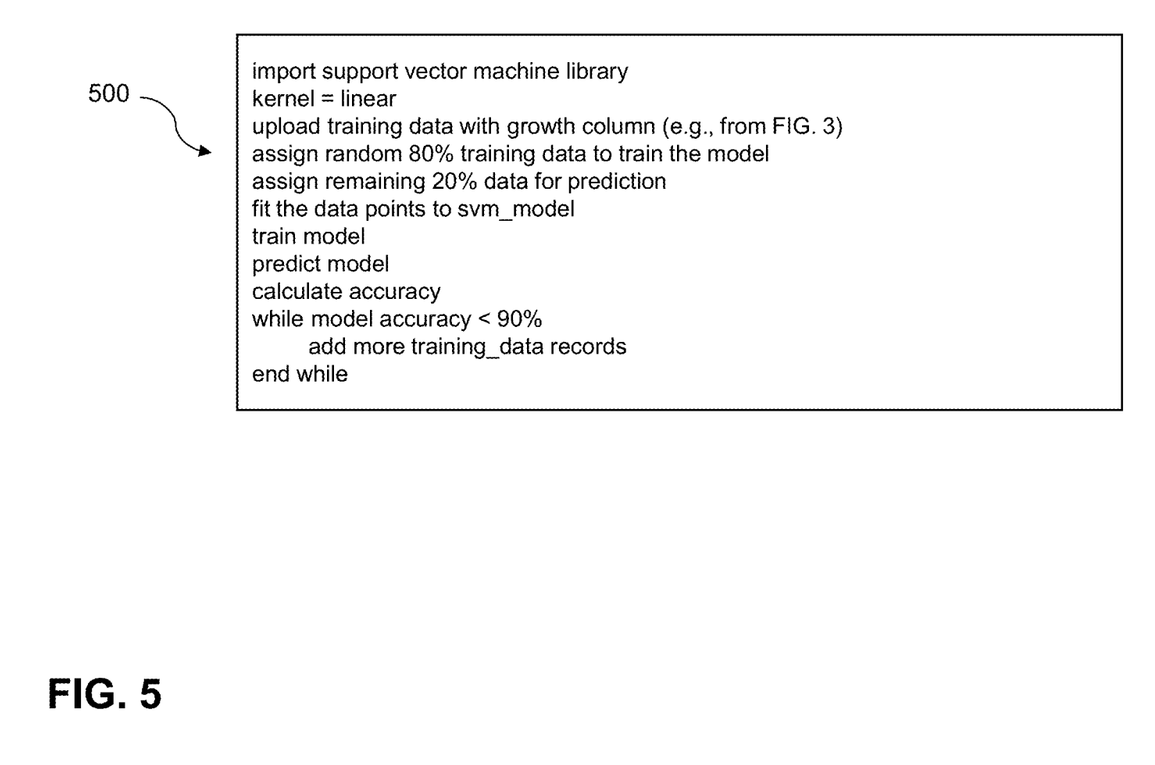
FIG. 5 shows example pseudocode for training a Support Vector Machine (SVM) model in an illustrative embodiment.

FIG. 5 shows example pseudocode 500 for implementing at least a portion of a machine learning classification algorithm in an illustrative embodiment. In this embodiment, example pseudocode 500 is executed by or under the control of at least one processing system and/or device. For example, the example pseudocode 500 may be viewed as comprising a portion of a software implementation of at least part of the object level space forecasting system 105 of the FIG. 1 embodiment.

The pseudocode 500 is used to train a classification model, which in this example is an SVM model. The pseudocode 500 includes steps to import the required library files and upload the training data, which now include the growth column (as described above with respect to FIG. 3, for example). Pseudocode 500 divides training data into a set of data for training the model and a set of data used for prediction. Pseudocode 500 further illustrates steps to fit the data points to the SVM model and train the SVM model. The SVM model is ready to classify abnormal growth when the accuracy of the SVM model exceeds some threshold value (for example, above 90%). Otherwise, additional training data are needed. The additional training data are obtained based on feedback from the GPR model, for example. It is noted that such a GPR model can be used for all relational database management system (RDBMS) technology.

It is to be appreciated that the particular example pseudocode 500 shows just one example implementation of a portion of a machine learning classification algorithm, and alternative implementations of the process can be used in other embodiments.

Figure 6:
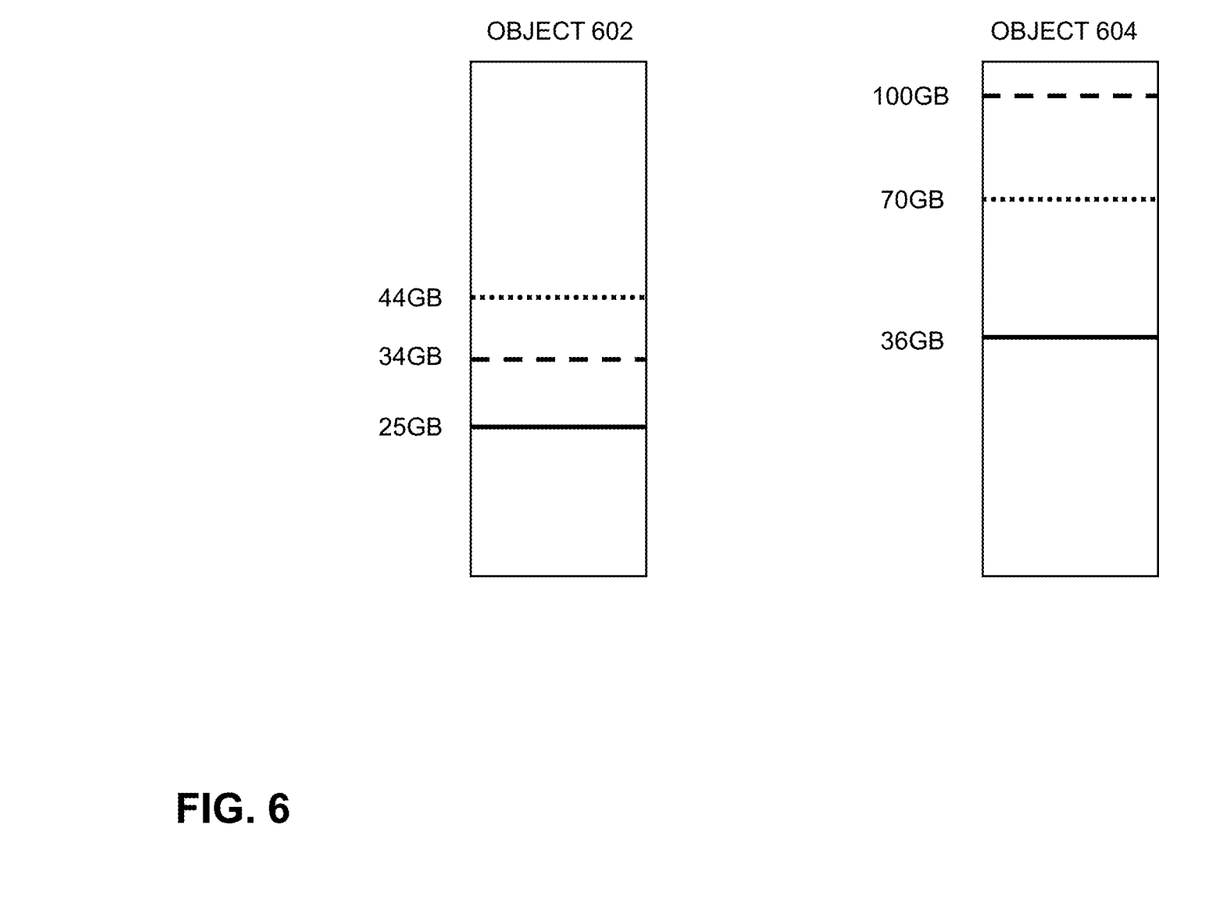
FIG. 6 shows predicted sizes and thresholds for two objects in accordance with an illustrative embodiment.

FIG. 6 shows predicted sizes and thresholds for two database objects in accordance with an illustrative embodiment. For each of the objects 602, 604 shown in FIG. 6, solid lines represent current sizes, dashed lines represent the next growth size and dotted lines represent the normal growth threshold. By way of example, the next growth size may be determined based on a trained non-linear regression model (as described in FIG. 3, for example), and the growth threshold may be determined based on the trained classification model (as described in FIG. 5, for example). More specifically, object 602 has a current size of 25 GB, a next growth size of 34 GB and a threshold growth size of 44 GB. The growth of object 602 is classified as normal as the next growth size is below the normal growth threshold; whereas the growth of object 604 is classified as abnormal as the next growth size of 100 GB is above the normal growth threshold of 70 GB. As such, one or more embodiments can monitor and account for the unique growth rates of different database objects.

Figure 7:
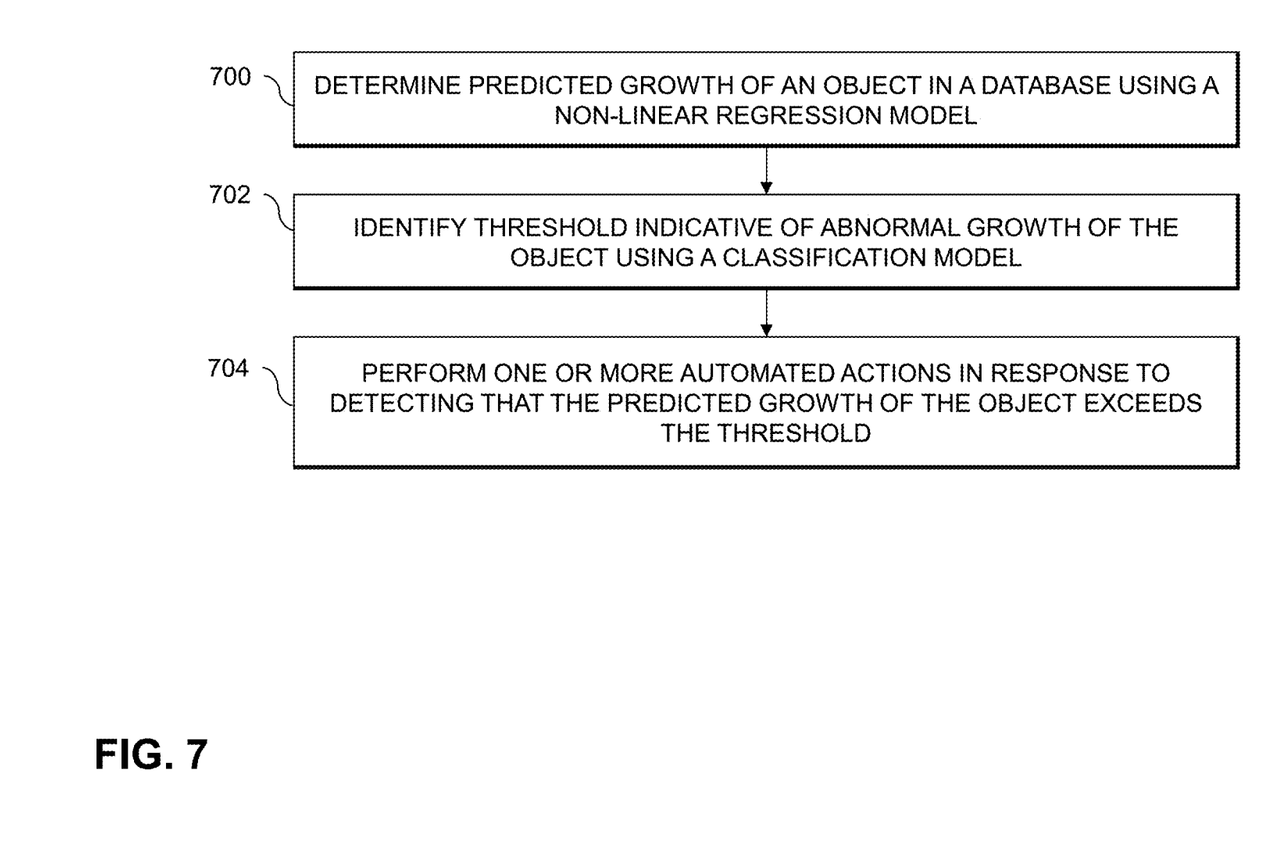
FIG. 7 shows a flow diagram for object level forecasting in an illustrative embodiment.

FIG. 7 is a flow diagram of a process for object level space forecasting in an illustrative embodiment. It is to be understood that this particular process is only an example, and additional or alternative processes can be carried out in other embodiments.

In this embodiment, the process includes steps 700 through 704. These steps are assumed to be performed by the object level space forecasting system 105 utilizing its modules 112, 114 and 116. Step 700 includes determining a predicted growth of an object in a database using a non-linear regression model, wherein the non-linear regression model is trained using a set of data records indicative of a size of the object over time. Step 702 includes identifying a threshold indicative of abnormal growth of the object using a classification model, wherein the classification model is trained at least in part on one or more of the data records that are labeled as anomalous based at least in part on one or more prior values of the predicted growth and actual growth of the object. Step 704 includes performing one or more automated operations in response to detecting that the predicted growth of the object exceeds the threshold.

The non-linear regression model may include a GPR model, and the classification model may include an SVM model. Additionally, the techniques depicted in FIG. 7 may further include determining a confidence threshold band associated with the predicted growth determined by the non-linear regression model; and labeling a given one of the data records as anomalous when the actual growth of the object is outside the determined confidence threshold band. Each of the data records may include information corresponding to at least one of: a delete operation; an insert operation; a current size of the object; a difference in size of the object over a period of time; a time; and a date.

The one or more automated operations may include at least one of: a purge operation on the database; an archive operation on the database; a query tuning operation on the database; and an index creation operation on the database. The database may include a plurality of objects, wherein each of the objects is independently monitored based at least in part on a respective non-linear regression model and a respective classification model. The set of records may include historical database records corresponding to the object for a given period of time. The techniques in FIG. 7 may further include training the non-linear regression model and the classification model.

Accordingly, the particular processing operations and other functionality described in conjunction with the flow diagram of FIG. 7 are presented by way of illustrative example only and should not be construed as limiting the scope of the disclosure in any way. For example, the ordering of the process steps may be varied in other embodiments, or certain steps may be performed concurrently with one another rather than serially.

The above-described illustrative embodiments provide significant advantages relative to conventional approaches. For example, some embodiments are configured to detect and address potential performance issues caused by abnormal growth of database objects using machine learning techniques and provide new capacity planning features to address performance issues and outages before they occur. Additionally, at least some example embodiments identify opportunities to purge or archive data and to perform query tuning and index creation to maintain or enhance the performance of a query based on object level forecasting. These and other embodiments can effectively overcome problems associated with inaccurate storage space forecasts that rely on linear regression models and fail to detect abnormal growth of individual objects.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

As mentioned previously, at least portions of the information processing system 100 can be implemented using one or more processing platforms. A given such processing platform comprises at least one processing device comprising a processor coupled to a memory. The processor and memory in some embodiments comprise respective processor and memory elements of a virtual machine or container provided using one or more underlying physical machines. The term "processing device" as used herein is intended to be broadly construed so as to encompass a wide variety of different arrangements of physical processors, memories and other device components as well as virtual instances of such components. For example, a "processing device" in some embodiments can comprise or be executed across one or more virtual processors. Processing devices can therefore be physical or virtual and can be executed across one or more physical or virtual processors. It should also be noted that a given virtual device can be mapped to a portion of a physical one.

Some illustrative embodiments of a processing platform used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components, or portions thereof, are illustratively implemented for use by tenants of such a multi-tenant environment.

As mentioned previously, cloud infrastructure as disclosed herein can include cloud-based systems. Virtual machines provided in such systems can be used to implement at least portions of a computer system in illustrative embodiments.

In some embodiments, the cloud infrastructure additionally or alternatively comprises a plurality of containers implemented using container host devices. For example, as detailed herein, a given container of cloud infrastructure illustratively comprises a Docker container or other type of LINUX Container (LXC). The containers are run on virtual machines in a multi-tenant environment, although other arrangements are possible. The containers are utilized to implement a variety of different types of functionality within the system 100. For example, containers can be used to implement respective processing devices providing compute and/or storage services of a cloud-based system. Again, containers may be used in combination with other virtualization infrastructure such as virtual machines implemented using a hypervisor.

Illustrative embodiments of processing platforms will now be described in greater detail with reference to FIGS. 8 and 9. Although described in the context of system 100, these platforms may also be used to implement at least portions of other information processing systems in other embodiments.

Figure 8:
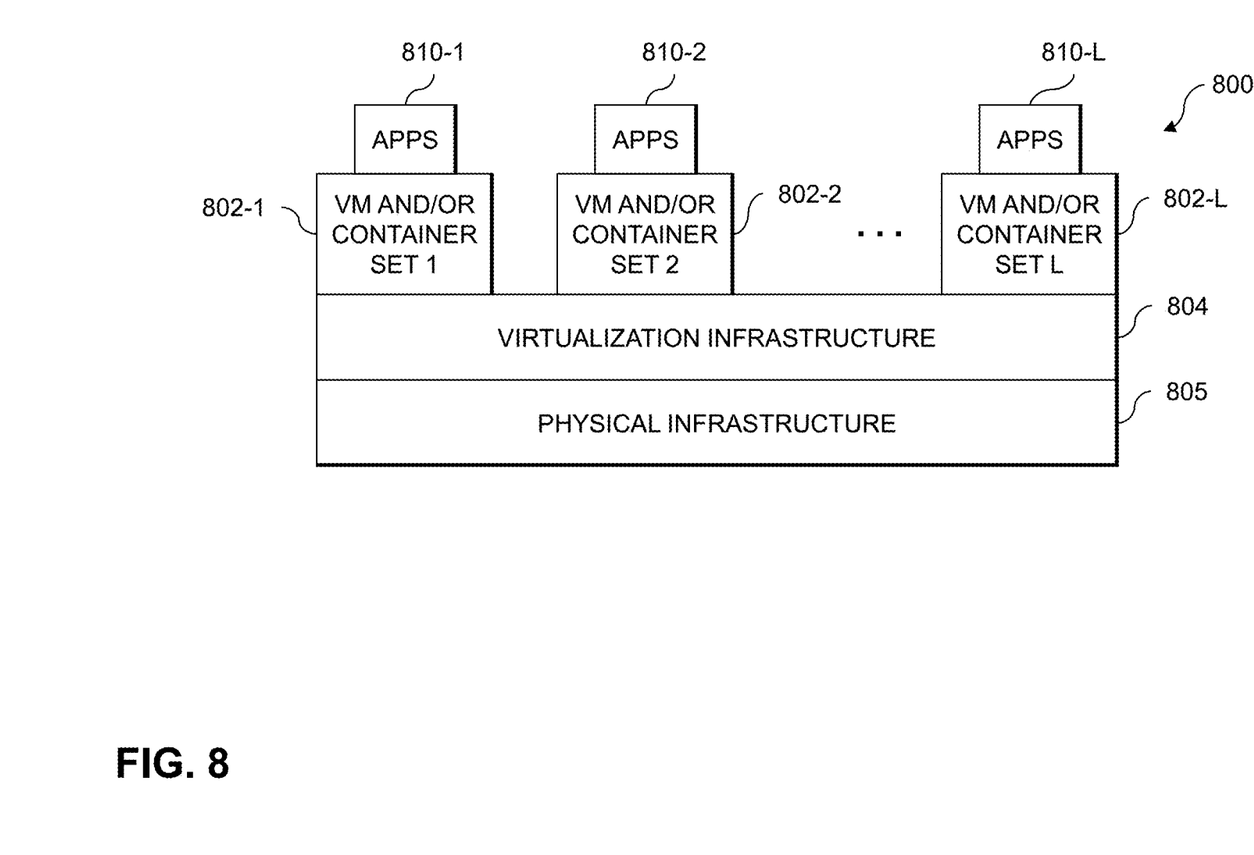
FIGS. 8 and 9 show examples of processing platforms that may be utilized to implement at least a portion of an information processing system in illustrative embodiments.
Figure 9:
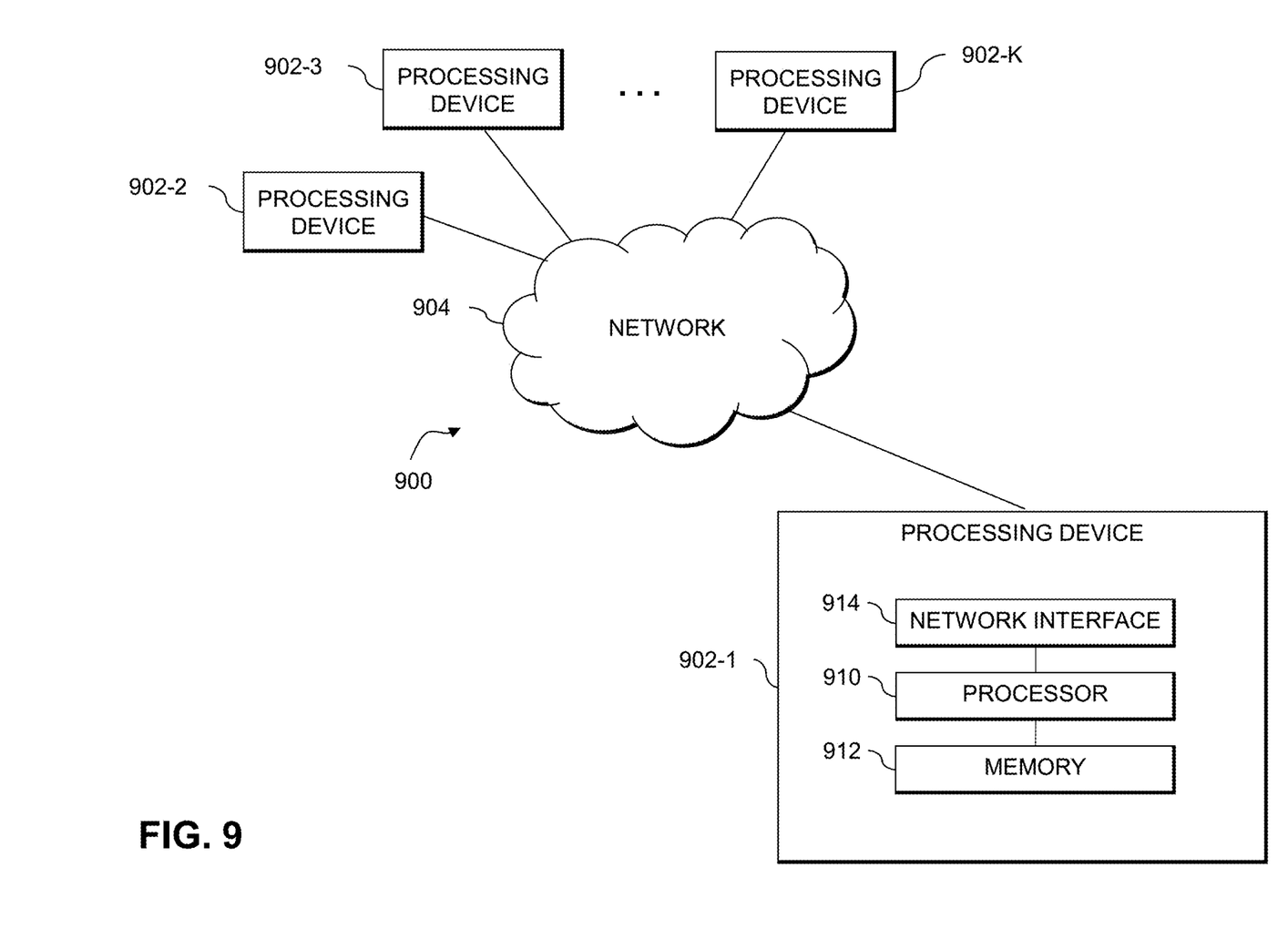

FIG. 8 shows an example processing platform comprising cloud infrastructure 800. The cloud infrastructure 800 comprises a combination of physical and virtual processing resources that are utilized to implement at least a portion of the information processing system 100. The cloud infrastructure 800 comprises multiple virtual machines (VMs) and/or container sets 802-1, 802-2, . . . 802-L implemented using virtualization infrastructure 804. The virtualization infrastructure 804 runs on physical infrastructure 805, and illustratively comprises one or more hypervisors and/or operating system level virtualization infrastructure. The operating system level virtualization infrastructure illustratively comprises kernel control groups of a LINUX operating system or other type of operating system.

The cloud infrastructure 800 further comprises sets of applications 810-1, 810-2, . . . 810-L running on respective ones of the VMs/container sets 802-1, 802-2, . . . 802-L under the control of the virtualization infrastructure 804. The VMs/container sets 802 comprise respective VMs, respective sets of one or more containers, or respective sets of one or more containers running in VMs. In some implementations of the FIG. 8 embodiment, the VMs/container sets 802 comprise respective VMs implemented using virtualization infrastructure 804 that comprises at least one hypervisor.

A hypervisor platform may be used to implement a hypervisor within the virtualization infrastructure 804, wherein the hypervisor platform has an associated virtual infrastructure management system. The underlying physical machines comprise one or more distributed processing platforms that include one or more storage systems.

In other implementations of the FIG. 8 embodiment, the VMs/container sets 802 comprise respective containers implemented using virtualization infrastructure 804 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element is viewed as an example of what is more generally referred to herein as a "processing device." The cloud infrastructure 800 shown in FIG. 8 may represent at least a portion of one processing platform. Another example of such a processing platform is processing platform 900 shown in FIG. 9.

The processing platform 900 in this embodiment comprises a portion of system 100 and includes a plurality of processing devices, denoted 902-1, 902-2, 902-3, . . . 902-K, which communicate with one another over a network 904.

The network 904 comprises any type of network, including by way of example a global computer network such as the Internet, a WAN, a LAN, a satellite network, a telephone or cable network, a cellular network, a wireless network such as a WI-FI or WIMAX network, or various portions or combinations of these and other types of networks.

The processing device 902-1 in the processing platform 900 comprises a processor 910 coupled to a memory 912.

The processor 910 comprises a microprocessor, a microcontroller, an ASIC, a FPGA or other type of processing circuitry, as well as portions or combinations of such circuitry elements.

The memory 912 comprises RAM, ROM or other types of memory, in any combination. The memory 912 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture comprises, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 902-1 is network interface circuitry 914, which is used to interface the processing device with the network 904 and other system components and may comprise conventional transceivers.

The other processing devices 902 of the processing platform 900 are assumed to be configured in a manner similar to that shown for processing device 902-1 in the figure.

Again, the particular processing platform 900 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage products or devices, or other components are possible in the information processing system 100. Such components can communicate with other elements of the information processing system 100 over any type of network or other communication media.

For example, particular types of storage products that can be used in implementing a given storage system of a distributed processing system in an illustrative embodiment include all-flash and hybrid flash storage arrays, scale-out all-flash storage arrays, scale-out NAS clusters, or other types of storage arrays. Combinations of multiple ones of these and other storage products can also be used in implementing a given storage system in an illustrative embodiment.

It should again be emphasized that the above-described embodiments are presented for purposes of illustration only. Many variations and other alternative embodiments may be used. Also, the particular configurations of system and device elements and associated processing operations illustratively shown in the drawings can be varied in other embodiments. Thus, for example, the particular types of processing devices, modules, systems and resources deployed in a given embodiment and their respective configurations may be varied. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A computer-implemented method comprising:
    determining one or more first predicted growth values of a first object in a database comprising a plurality of objects, using a first non-linear regression machine learning model, wherein the first non-linear regression machine learning model is trained, using a first set of data records indicative of a size of the first object over time, to generate a confidence threshold band around the one or more first predicted growth values;
    automatically updating at least a portion of the first set of data records by labeling a given data record as anomalous in response to an actual growth value of the first object deviating from the confidence threshold band generated by the first non-linear regression machine learning model corresponding to one or more second predicted growth values of the first object output by the first non-linear regression machine learning model;
    training a first classification model based at least in part on the updated data records in the first set of data records, wherein the first classification model is trained to identify a threshold indicative of abnormal growth of the first object that is indicative of one or more database performance issues;
    monitoring the size of the first object using the first non-linear regression machine learning model and the first classification model based on one or more additional data records indicative of the size of the first object;
    predicting, based on the monitoring, one or more of the database performance issues, in response to detecting that at least one third predicted growth value of the first object, output by the first non-linear regression machine learning model for at least one of the additional data records, exceeds the threshold;
    performing one or more automated maintenance operations on the database to preemptively address at least a portion of the one or more predicted database performance issues, wherein the one or more automated maintenance operations comprise an index creation operation that programmatically generates a data index and integrates the data index into the database to reduce data search and retrieval times within the database as compared to data search and retrieval times without the generated data index; and
    separately monitoring at least one second object of the plurality of objects in the database using a second non-linear regression machine learning model and a second classification model that are trained based at least in part on a second set of data records indicative of a size of the at least one second object over time;
    wherein the method is performed by at least one processing device comprising a processor coupled to a memory.

2. The computer-implemented method of claim 1, wherein the first non-linear regression machine learning model comprises a Gaussian process regression model.

3. The computer-implemented method of claim 1, wherein the first classification model comprises a support vector machine model.

4. The computer-implemented method of claim 1, wherein each of the data records in the first set comprises information corresponding to at least one of:
    a delete operation;
    an insert operation;
    a current size of the first object;
    a difference in size of the first object over a period of time;
    a time; and
    a date.

5. The computer-implemented method of claim 1, wherein the one or more automated maintenance operations further comprise at least one of an archive operation and a purge operation on the database.

6. The computer-implemented method of claim 1, wherein the first set of data records comprises historical database records corresponding to the first object for a given period of time.

7. The computer-implemented method of claim 1, wherein the training comprises adjusting at least one training parameter based on a designated threshold of accuracy for a predicted growth of the first object.

8. The computer-implemented method of claim 1, wherein the first object comprises a data table, and wherein the data index categorizes data records in the data table based on one or more fields to enable retrieval of a given data record in the database without searching other portions of the data table.

9. The computer-implemented method of claim 1, wherein the one or more automated maintenance operations further comprise a query tuning operation that adjusts at least one of a syntax and a clause arrangement of a query corresponding to the first object.

10. A non-transitory processor-readable storage medium having stored therein program code of one or more software programs, wherein the program code when executed by at least one processing device causes the at least one processing device:
    to determine one or more first predicted growth values of a first object in a database comprising a plurality of objects, using a first non-linear regression machine learning model, wherein the first non-linear regression machine learning model is trained, using a first set of data records indicative of a size of the first object over time, to generate a confidence threshold band around the one or more first predicted growth values;
    to automatically update at least a portion of the first set of data records by labeling a given data record as anomalous in response to an actual growth value of the first object deviating from the confidence threshold band generated by the first non-linear regression machine learning model corresponding to one or more second predicted growth values of the first object output by the first non-linear regression machine learning model;
    to train a first classification model based at least in part on the updated data records in the first set of data records, wherein the first classification model is trained to identify a threshold indicative of abnormal growth of the first object that is indicative of one or more database performance issues;
    to monitor the size of the first object using the first non-linear regression machine learning model and the first classification model based on one or more additional data records indicative of the size of the first object;
    to predict, based on the monitoring, one or more of the database performance issues, in response to detecting that at least one third predicted growth value of the first object, output by the first non-linear regression machine learning model for at least one of the additional data records, exceeds the threshold;

to perform one or more automated maintenance operations on the database to preemptively address at least a portion of the one or more predicted database performance issues, wherein the one or more automated maintenance operations comprise an index creation operation that programmatically generates a data index and integrates the data index into the database to reduce data search and retrieval times within the database as compared to data search and retrieval times without the generated data index; and to separately monitor at least one second object of the plurality of objects in the database using a second non-linear regression machine learning model and a second classification model that are trained based at least in part on a second set of data records indicative of a size of the at least one second object over time.

11. The non-transitory processor-readable storage medium of claim 10, wherein the first non-linear regression machine learning model comprises a Gaussian process regression model.

12. The non-transitory processor-readable storage medium of claim 10, wherein the first classification model comprises a support vector machine model.

13. The non-transitory processor-readable storage medium of claim 10, wherein each of the data records in the first set comprises information corresponding to at least one of:
a delete operation;
an insert operation;
a current size of the first object;
a difference in size of the first object over a period of time;
a time; and
a date.

14. The non-transitory processor-readable storage medium of claim 10, wherein the one or more automated maintenance operations further comprise at least one of an archive operation and a purge operation on the database.

15. The non-transitory processor-readable storage medium of claim 10, wherein the one or more automated maintenance operations further comprise a query tuning operation that adjusts at least one of a syntax and a clause arrangement of a query corresponding to the first object.

16. An apparatus comprising:
at least one processing device comprising a processor coupled to a memory;
the at least one processing device being configured:
to determine one or more first predicted growth values of a first object in a database comprising a plurality of objects, using a first non-linear regression machine learning model, wherein the first non-linear regression machine learning model is trained, using a first set of data records indicative of a size of the first object over time, to generate a confidence threshold band around the one or more first predicted growth values;

to automatically update at least a portion of the first set of data records by labeling a given data record as anomalous in response to an actual growth value of the first object deviating from the confidence threshold band generated by the first non-linear regression machine learning model corresponding to one or more second predicted growth values of the first object output by the first non-linear regression machine learning model;

to train a first classification model based at least in part on the updated data records in the first set of data records, wherein the first classification model is trained to identify a threshold indicative of abnormal growth of the first object that is indicative of one or more database performance issues;

to monitor the size of the first object using the first non-linear regression machine learning model and the first classification model based on one or more additional data records indicative of the size of the first object;

to predict, based on the monitoring, one or more of the database performance issues, in response to detecting that at least one third predicted growth value of the first object, output by the first non-linear regression machine learning model for at least one of the additional data records, exceeds the threshold;

to perform one or more automated maintenance operations on the database to preemptively address at least a portion of the one or more predicted database performance issues, wherein the one or more automated maintenance operations comprise an index creation operation that programmatically generates a data index and integrates the data index into the database to reduce data search and retrieval times within the database as compared to data search and retrieval times without the generated data index; and to separately monitor at least one second object of the plurality of objects in the database using a second non-linear regression machine learning model and a second classification model that are trained based at least in part on a second set of data records indicative of a size of the at least one second object over time.

17. The apparatus of claim 16, wherein the first non-linear regression machine learning model comprises a Gaussian process regression model.

18. The apparatus of claim 16, wherein the first classification model comprises a support vector machine model.

19. The apparatus of claim 16, wherein the one or more automated maintenance operations further comprise at least one of an archive operation and a purge operation on the database.

20. The apparatus of claim 16, wherein the one or more automated maintenance operations further comprise a query tuning operation that adjusts at least one of a syntax and a clause arrangement of a query corresponding to the first object.

* * * * *